United States Patent
Osuga et al.

(10) Patent No.: US 11,652,397 B2
(45) Date of Patent: May 16, 2023

(54) HALL THRUSTER POWER SUPPLY DEVICE AND CONTROL METHOD OF HALL THRUSTER POWER SUPPLY DEVICE

(71) Applicant: Mitsubishi Electric Corporation, Chiyoda-ku (JP)

(72) Inventors: Hiroyuki Osuga, Chiyoda-ku (JP); Takayuki Hidaka, Chiyoda-ku (JP); Takashi Miyamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 976 days.

(21) Appl. No.: 16/328,003

(22) PCT Filed: Oct. 12, 2016

(86) PCT No.: PCT/JP2016/080263
§ 371 (c)(1),
(2) Date: Feb. 25, 2019

(87) PCT Pub. No.: WO2018/069994
PCT Pub. Date: Apr. 19, 2018

(65) Prior Publication Data
US 2021/0261275 A1  Aug. 26, 2021

(51) Int. Cl.
*H02M 1/08* (2006.01)
*F03H 1/00* (2006.01)

(52) U.S. Cl.
CPC ............ *H02M 1/08* (2013.01); *F03H 1/0081* (2013.01)

(58) Field of Classification Search
CPC .................. F03H 1/0018; F03H 1/0062–0068
See application file for complete search history.

(56) References Cited

U.S. PATENT DOCUMENTS

| | | |
|---|---|---|
| 2008/0047256 A1 | 2/2008 | Gallimore et al. |
| 2011/0073714 A1 | 3/2011 | Hruby et al. |
| 2014/0090357 A1 | 4/2014 | Zurbach et al. |
| 2014/0268900 A1* | 9/2014 | Hu .................. H02M 3/158 363/18 |

(Continued)

FOREIGN PATENT DOCUMENTS

| | | |
|---|---|---|
| JP | 2013-150530 A | 1/2013 |
| JP | 2014-519573 A | 8/2014 |

OTHER PUBLICATIONS

Barral "Closed-loop control of ionization oscillations in Hall accelerators" (Year: 2011).*

(Continued)

*Primary Examiner* — Arun Goyal
*Assistant Examiner* — William L Breazeal
(74) *Attorney, Agent, or Firm* — Oblon, McClelland, Maier & Neustadt, L.L.P.

(57) ABSTRACT

A time average peak value of low frequency magnetic noise or low frequency conductive noise generated from a power supply device which drives a Hall thruster is suppressed without mass of a satellite significantly increased. A pulse width control circuit (22) of a Hall thruster power supply device (10) outputs a spread signal (58) obtained by performing spread spectrum on a pulse signal based on a control signal (54). A voltage output circuit (21) outputs output voltage (52) to a Hall thruster (50) in accordance with the spread signal (58) output by the pulse width control circuit (22).

19 Claims, 7 Drawing Sheets

(56) References Cited

U.S. PATENT DOCUMENTS

2016/0172955 A1    6/2016  Sirous

OTHER PUBLICATIONS

Lorenzo "SCGG Methods of EMI Emissions Reduction Applied to Switching Power Converters" (Year: 2004).*
Dousoky "FPGA-Based Design and Implementation of Spread Spectrum Schemes for Conducted-Noise Reduction in DC-DC Converters" (Year: 2009).*
International Search Report dated Nov. 22, 2016 in PCT/JP2016/080263 filed Oct. 12, 2016.

* cited by examiner

HALL THRUSTER POWER SUPPLY DEVICE AND CONTROL METHOD OF HALL THRUSTER POWER SUPPLY DEVICE

TECHNICAL FIELD

The present invention relates to a power supply device which drives a Hall thruster and a control method of the power supply device.

BACKGROUND ART

In order to allow a Hall thruster to stably operate and to extend a lifetime of the Hall thruster, a power supply device which drives the Hall thruster applies pulse voltage a frequency of which is fixed to a certain constant between an anode and a cathode of the Hall thruster and drives the Hall thruster. A pulse width of the pulse voltage is 5 μsec to 15 μsec.

Therefore, in the power supply device which drives the Hall thruster, low frequency magnetic field noise or low frequency conductive noise occurs due to a repetition frequency of the pulse voltage. Especially with a high-power Hall thruster, large low frequency magnetic field noise or low frequency conductive noise occurs. A standard of low frequency magnetic field noise is MIL-STD-461 RE01. Also, a standard of low frequency conductive noise is MIL-STD-461 CE 01.

Patent Literature 1 discloses driving a Hall thruster with pulse voltage.

CITATION LIST

Patent Literature

Patent Literature 1: JP 2014-513230 A

SUMMARY OF INVENTION

Technical Problem

In an artificial satellite in which a Hall thruster is used, it is necessary to arrange devices at high density in a limited space. Therefore, countermeasures such as arranging a device likely to be interfered with by low frequency magnetic field noise or low frequency conductive noise at a physical distance from the Hall thruster or shielding the device with a material capable of shielding radio waves are taken. However, taking such countermeasures significantly increases mass of the satellite.

An object of the present invention is to suppress a time average peak value of low frequency magnetic noise or low frequency conductive noise generated from a power supply device which drives the Hall thruster.

Solution to Problem

A Hall thruster power supply device according to the present invention includes:

a spread circuit to output a spread signal obtained by performing spread spectrum on a pulse signal based on a control signal; and a voltage output circuit to output voltage to a Hall thruster in accordance with the spread signal output by the spread circuit.

Advantageous Effects of Invention

In the present invention, output voltage is output to a Hall thruster based on a spread signal obtained by performing spread spectrum on a pulse signal according to a control signal. This makes it possible to suppress a time average peak value of low frequency magnetic noise or low frequency conductive noise.

DESCRIPTION OF EMBODIMENTS

First Embodiment

*Description of Configuration*

Figure 1:
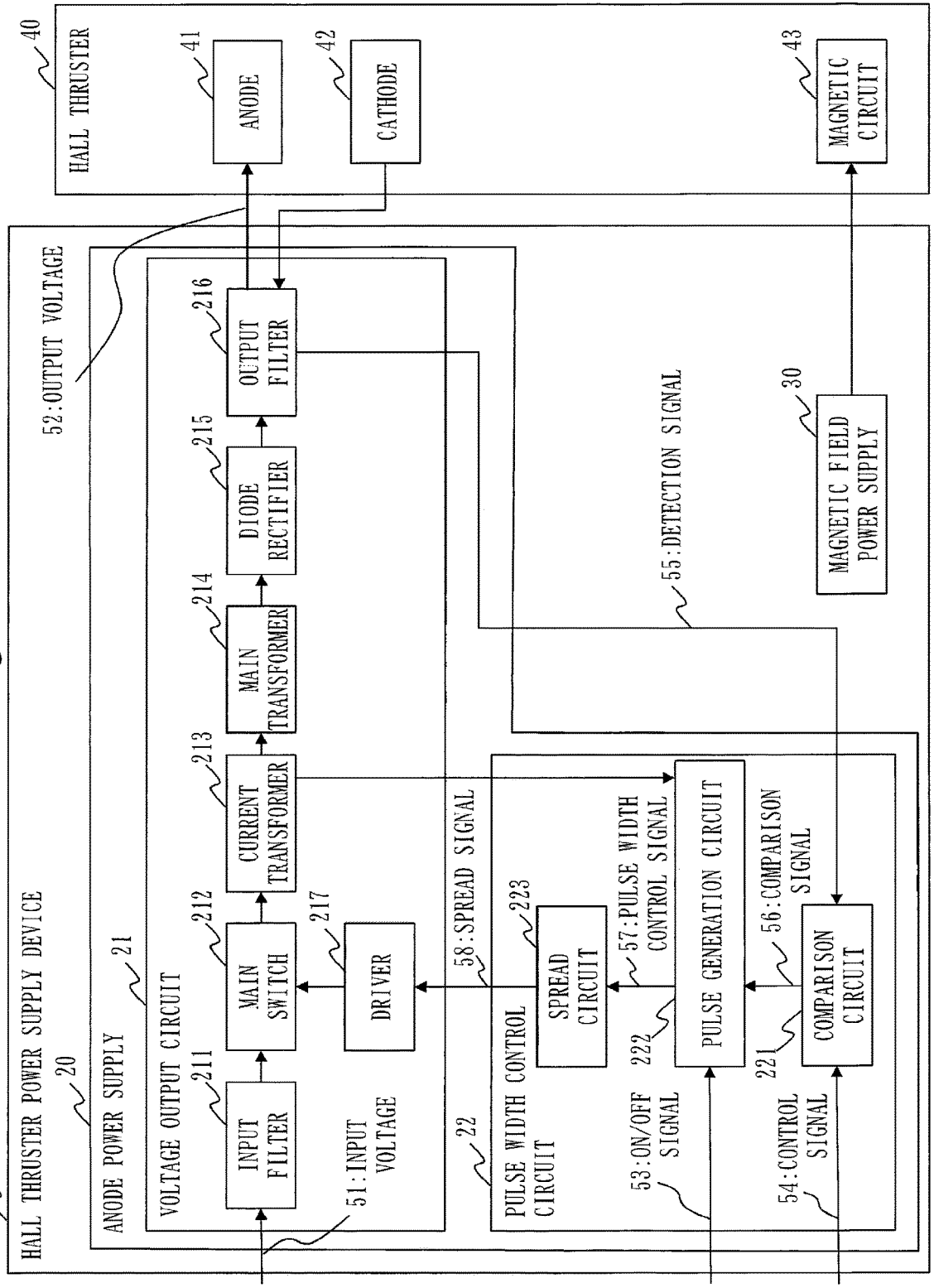
FIG. 1 is a configuration diagram of a Hall thruster power supply device 10 according to a first embodiment.

A configuration of a Hall thruster power supply device 10 according to a first embodiment is described with reference to FIG. 1.

The Hall thruster power supply device 10 is a power supply device for driving a Hall thruster 40 mounted on an artificial satellite or the like.

The Hall thruster 40 is provided with an anode 41 for applying an electric field, a cathode 42 for receiving electrons, and a magnetic circuit 43 for generating a magnetic field. The Hall thruster 40 receives a supply of electric power capable of generating at least an electric field E and a magnetic field B from the Hall thruster power supply device 10 in a state of being supplied with xenon gas or the like as propellant serving as a plasma source and generates thrust force by an electromagnetic acceleration mechanism based on Lawrence force (electric field E x magnetic field B).

The Hall thruster power supply device 10 is provided with an anode power supply 20 and a magnetic field power supply 30. The anode power supply 20 is a device which controls the electric field E and is a device which supplies the electric power for accelerating plasma between the anode 41 and the cathode 42 of the Hall thruster 40. The magnetic field power supply 30 is a device which controls the magnetic field B and is a device which supplies the electric power to the magnetic circuit 43 of the Hall thruster 40.

The anode power supply 20 is provided with a voltage output circuit 21 which outputs voltage between the anode 41 and the cathode 42 of the Hall thruster 40 and a pulse width control circuit 22 which controls the voltage output by the voltage output circuit 21. The voltage output circuit 21 is provided with an input filter 211, a main switch 212, a current transformer 213, a main transformer 214, a diode rectifier 215, an output filter 216, and a driver 217. The pulse width control circuit 22 is provided with a comparison circuit 221, a pulse generation circuit 222, and a spread circuit 223.

*Description of Operation*

Figure 2:
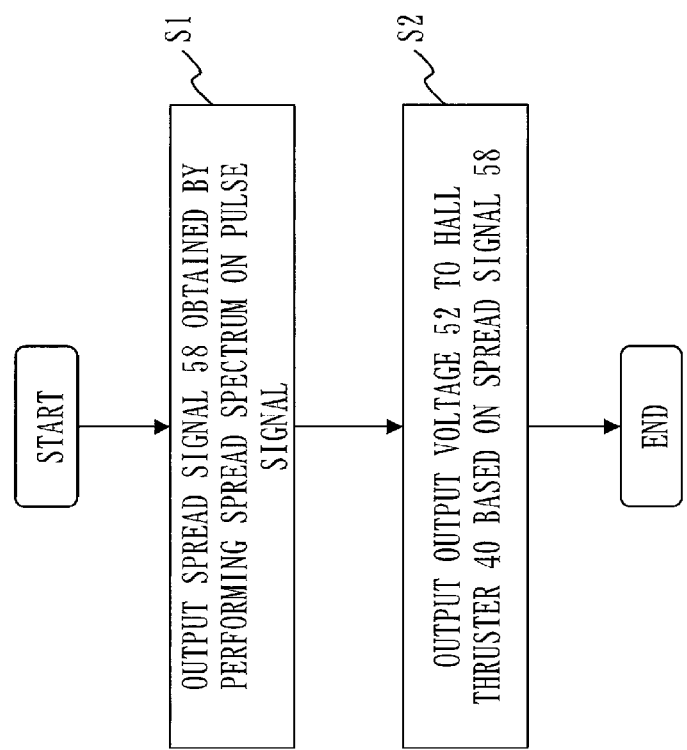
FIG. 2 is a flowchart illustrating operation of an anode power supply 20 according to the first embodiment.

Operation of the Hall thruster power supply device 10 according to the first embodiment is described with reference to FIGS. 2 and 3.

The operation of the Hall thruster power supply device 10 according to the first embodiment corresponds to a control method of the Hall thruster power supply device according to the first embodiment.

The Hall thruster power supply device 10 first supplies the electric power from the magnetic field power supply 30 to the magnetic circuit 43 of the Hall thruster 40. Next, in a state in which the Hall thruster 40 is filled with the propellant, the Hall thruster power supply device 10 applies output voltage 52 which is pulse voltage of approximately 10 μsec between the anode 41 and the cathode 42 of the Hall thruster 40 from the anode power supply 20 by turning on the anode power supply 20 in accordance with an on/off signal 53. Then, the xenon gas is converted into plasma and electromagnetically accelerated. As a result, the Hall thruster 40 is driven to generate the thrust force.

Operation of the anode power supply 20 according to the first embodiment is described with reference to FIG. 2.

(Step S1: Pulse Width Control Process)

The pulse width control circuit 22 performs spread spectrum on a pulse width control signal 57 which is a pulse signal based on the control signal 54, thereby outputting a spread signal 58 in which a spread waveform is formed to a driver 217 of the voltage output circuit 21.

(Step S2: Voltage Output Process)

In the voltage output circuit 21, based on the spread signal 58 output at step S1, the driver 217 on/off controls the main switch 212.

In accordance with the on/off control of the main switch 212, input voltage 51 accepted by the input filter 211 is output to the main transformer 214 via the current transformer 213. Alternating-current voltage boosted to reference voltage by the main transformer 214 is rectified by the diode rectifier 215, smoothed by the output filter 216, and applied as the output voltage 52 between the anode 41 and the cathode 42 of the Hall thruster 40.

A pulse width control process according to the first embodiment is described with reference to FIG. 3.

(Step S11: Comparison Process)

The comparison circuit 221 obtains a detection signal 55 of the output voltage 52 output to the Hall thruster 40 from an output filter 26. The comparison circuit 221 accepts an input of the control signal 54 from outside. Then, the comparison circuit 221 compares a signal level of the detection signal 55 with a signal level of the control signal 54 and outputs a comparison signal 56 indicating a comparison result.

For example, when the detection signal 55 indicates 180 volt (V) and the control signal 54 indicates 200 V, the comparison circuit 221 outputs the comparison signal 56 indicating that the output voltage 52 higher by 20 V is output.

(Step S12: Pulse Generation Process)

When the on/off signal 53 indicates turning on, the pulse generation circuit 222 outputs the pulse width control signal 57 proportional to a level value of the signal indicated by the comparison signal 56 output at step S11. At that time, the pulse generation circuit 222 outputs the pulse width control signal 57 in consideration of overcurrent protection based on a current value flowing through the main transformer 214 measured by the current transformer 213.

(Step S13: Spread Process)

The spread circuit 223 outputs the spread signal 58 obtained by performing spread spectrum on the pulse width control signal 57 output at step S12 to the driver 217 of the voltage output circuit 21.

*Effect of First Embodiment*

As described above, in the Hall thruster power supply device 10 according to the first embodiment, the main switch 212 is on/off controlled by the spread signal 58 obtained by performing spread spectrum on the pulse width control signal 57. Therefore, it is possible to supply appropriately controlled output voltage 52 to the Hall thruster 40.

As a result, it becomes possible to suppress a time average peak value of low frequency magnetic noise or low frequency conductive noise without significantly increasing mass of the satellite.

Second Embodiment

A second embodiment is different from the first embodiment in that output voltage 52 output from an anode power supply 20 is controlled in accordance with a voltage value output from a magnetic field power supply 30. In the second embodiment, this difference is described.

*Description of Configuration*

Figure 4:
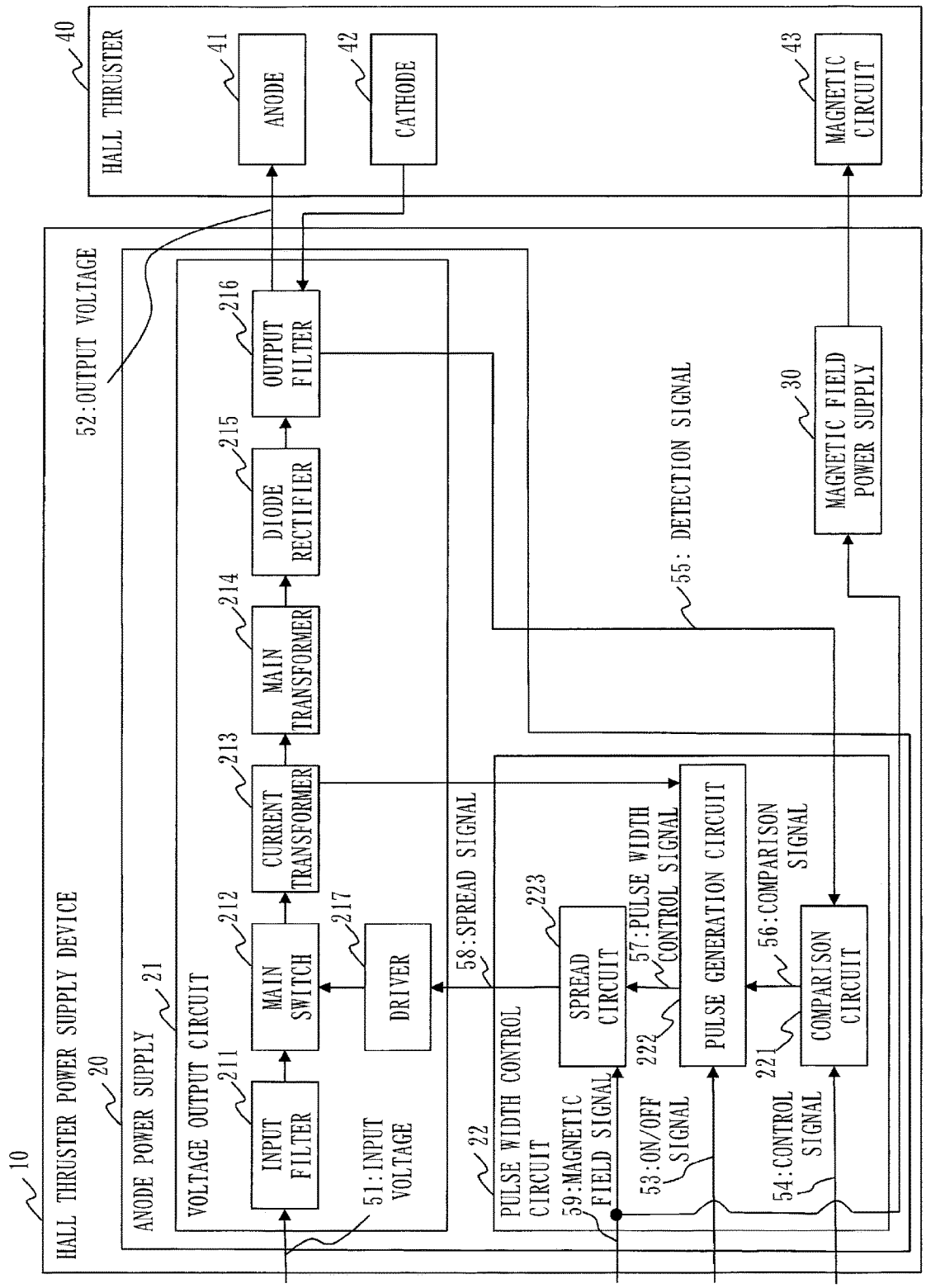
FIG. 4 is a configuration diagram of a Hall thruster power supply device 10 according to a second embodiment.

A configuration of a Hall thruster power supply device 10 according to the second embodiment is described with reference to FIG. 4.

A functional configuration of the Hall thruster power supply device 10 is the same as that of the Hall thruster power supply device 10 illustrated in FIG. 1. However, a magnetic field power supply 30 controls a voltage value to be output in accordance with a magnetic field signal 59 which controls a magnetic field of a Hall thruster 40. The magnetic field signal 59 is also input to a spread circuit 223.

*Description of Operation*

Figure 3:
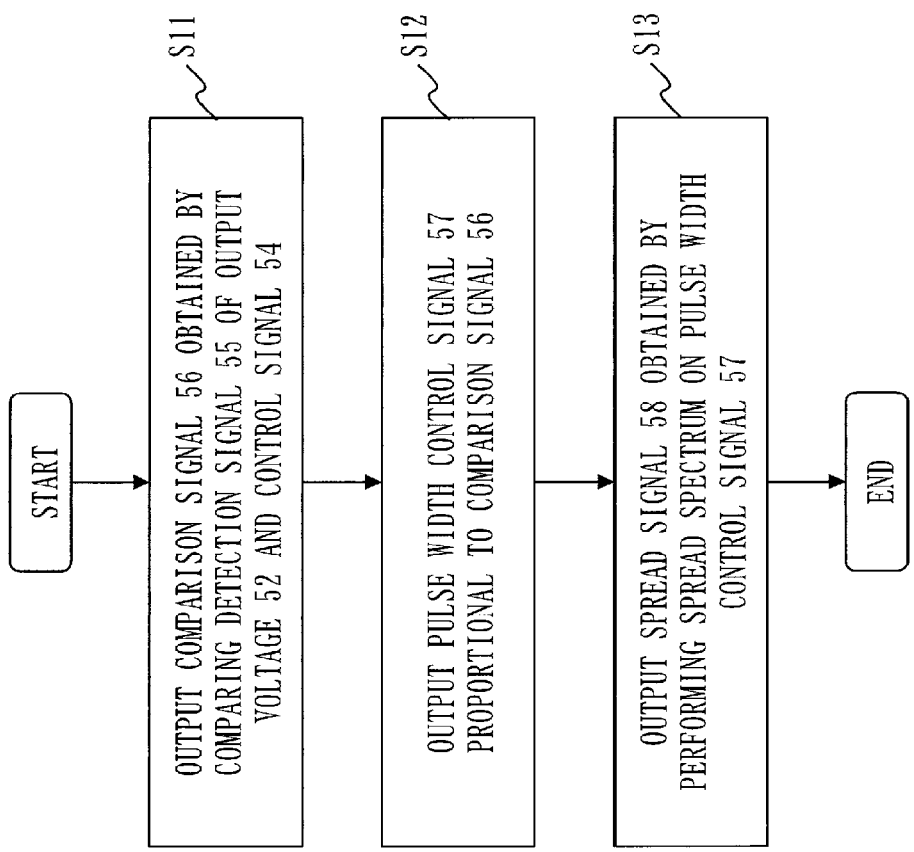
FIG. 3 is a flowchart of a pulse width control process according to the first embodiment.

At step S13 in FIG. 3, the spread circuit 223 outputs a spread signal 58 obtained by performing spread spectrum on a pulse width control signal 57 depending on the magnetic field signal 59 which controls the magnetic field of the Hall thruster 40. Specifically, the spread circuit 223 outputs the spread signal 58 which increases output voltage 52 as the magnetic field controlled by the magnetic field signal 59 is stronger. That is, the spread circuit 223 outputs the spread signal 58 such that a value of the output voltage 52 is directly proportional to a value of the magnetic field controlled by the magnetic field signal 59.

*Effect of Second Embodiment*

As described above, the Hall thruster power supply device 10 according to the second embodiment outputs the spread signal 58 depending on the magnetic field signal 59 which controls the magnetic field of the Hall thruster 40. This makes it possible to stably operate the Hall thruster 40.

That is, in the Hall thruster 40, when the value of the magnetic field changes, a peak operating point and a stable operating point of the output voltage 52 of maximum propellant utilization efficiency or at which maximum thrust force may output change. In the Hall thruster power supply device 10 according to the second embodiment, it is controlled such that a value of the output voltage 52 is directly proportional to the value of the magnetic field controlled by the magnetic field signal 59, so that operation of the Hall thruster 40 in an unstable region is eliminated and it becomes possible to stably operate the Hall thruster 40.

Third Embodiment

In a third embodiment, a specific example 1 of operation of a spread circuit 223 is described.

The spread circuit 223 outputs a spread signal 58 modulated in accordance with a certain rule in a range between ±10% and ±50% of a basic switching frequency for switching a main switch 212.

By controlling in this manner, low frequency magnetic noise or low frequency conductive noise of an anode power supply 20 may be attenuated by 12 dBμV or more as compared with a case without spread spectrum.

Figure 5:
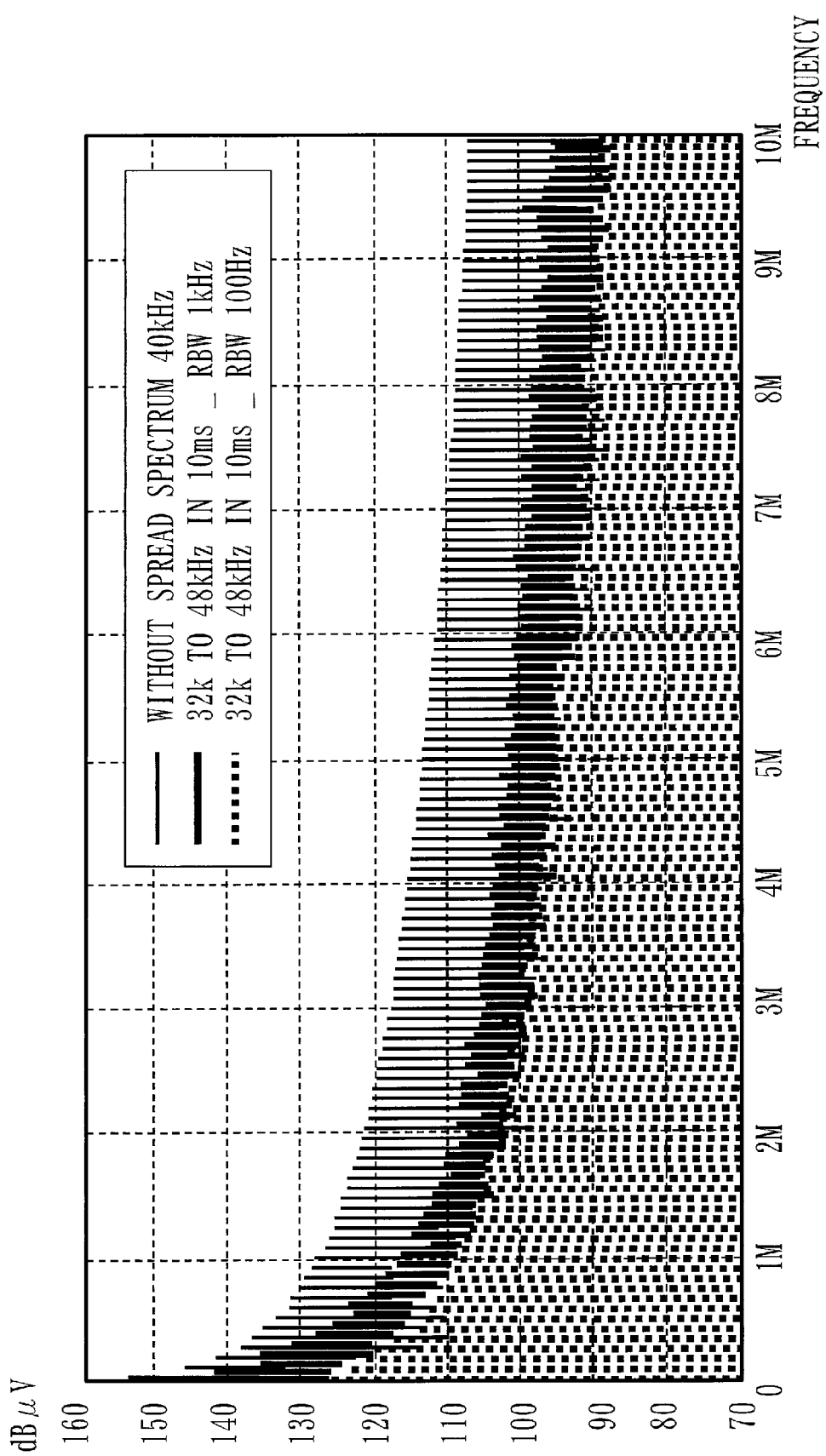
FIG. 5 is a view illustrating an effect of control according to a third embodiment.

As a specific example, as illustrated in FIG. 5, the spread circuit 223 gradually fluctuates a switching frequency in accordance with a rule of lowest 32 kHz (−20% of basic switching frequency)→highest 48 kHz (+20% of basic switching frequency)→lowest 32 kHz (−20% of basic switching frequency) in switching time of 10 milliseconds (ms) at a basic switching frequency of 40 kHz. In this specific example, in a case of resolution bandwidth (RBW) of 100 Hz, the low frequency magnetic noise or the low frequency conductive noise of the anode power supply 20 was reduced by approximately 25 dBμV at low frequencies and approximately 20 dBμV at high frequencies as compared with the case without spread spectrum.

Fourth Embodiment

A specific example 2 of operation of a spread circuit 223 is described in a fourth embodiment.

The spread circuit 223 outputs a spread signal 58 modulated while sequentially switching a plurality of switching frequencies for each reference time. That is, the spread circuit 223 outputs a plurality of frequencies while fixing a duty ratio which is a pulse width which defines a peak voltage value of output voltage 52 and performs spread spectrum.

By operating in this manner, it is possible to attenuate low frequency magnetic noise or low frequency conductive noise of an anode power supply 20 by approximately 6 dBμV.

Figure 6:
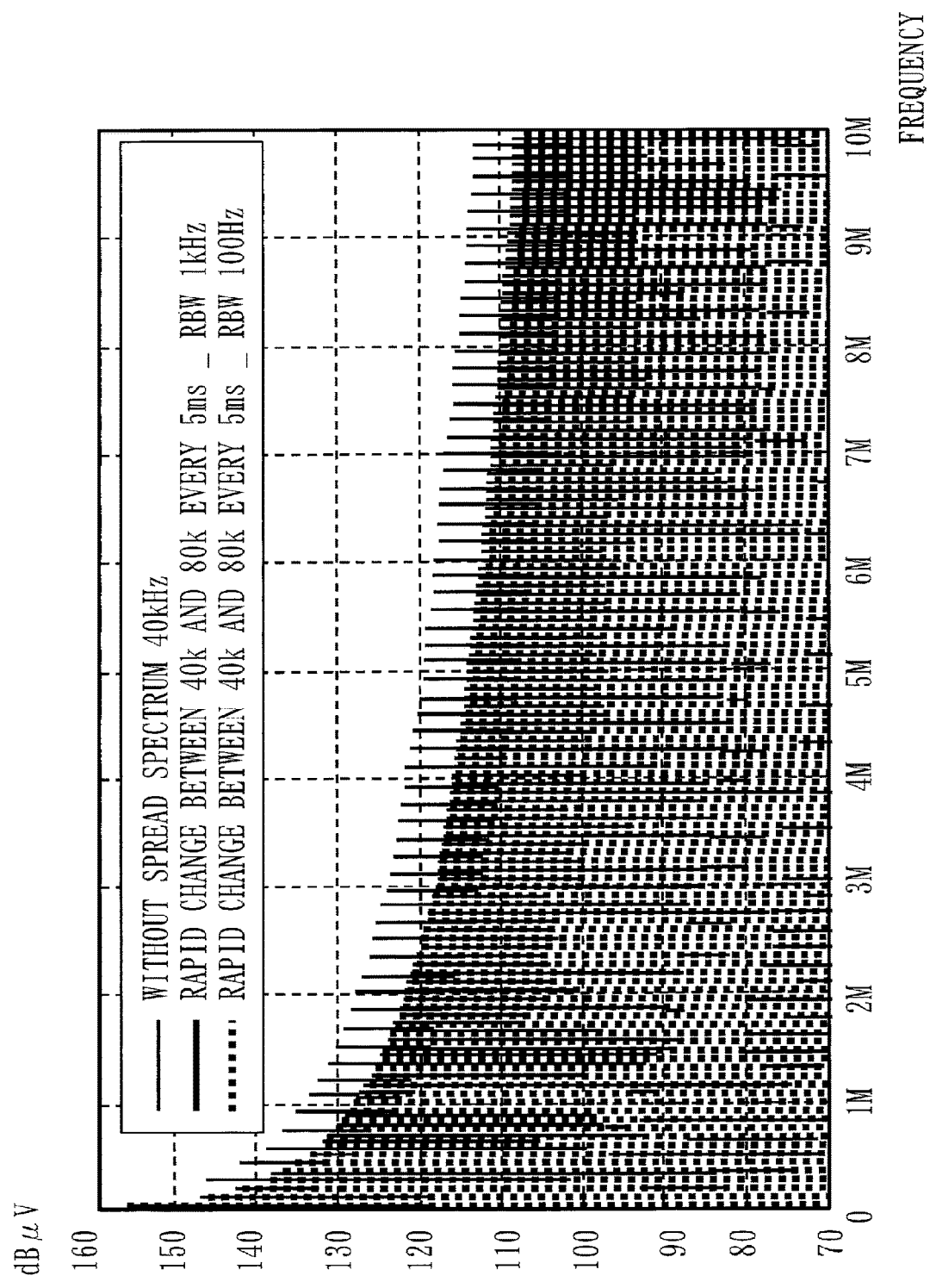
FIG. 6 is a view illustrating an effect of control according to a fourth embodiment.

As a specific example, as illustrated in FIG. 6, the spread circuit 223 alternately switches the switching frequency between 40 kHz and 80 kHz every 5 ms to fluctuate. In this specific example, in a case of a resolution bandwidth (RBW) of 100 Hz, the low frequency magnetic noise or the low frequency conductive noise of the anode power supply 20 was reduced by approximately 5 dBμV at low frequencies and by approximately 6 dBμV at high frequencies as compared with the case without spread spectrum.

Fifth Embodiment

In a fifth embodiment, a specific example 3 of operation of a spread circuit 223 is described.

The spread circuit 223 outputs a spread signal 58 modulated while sequentially switching a plurality of duty ratios for each reference time. That is, the spread circuit 223 determines at least two or more duty ratios which are pulse widths which determine a peak voltage value of output voltage 52 and repeatedly fluctuates the duty ratios to perform spread spectrum.

By operating in this manner, since an output of pulse voltage appearing in one second is averaged, a thrust performance of a Hall thruster 40 is averaged. Then, low frequency magnetic noise or low frequency conductive noise of an anode power supply 20 may be attenuated by approximately 25 dBμV.

Figure 7:
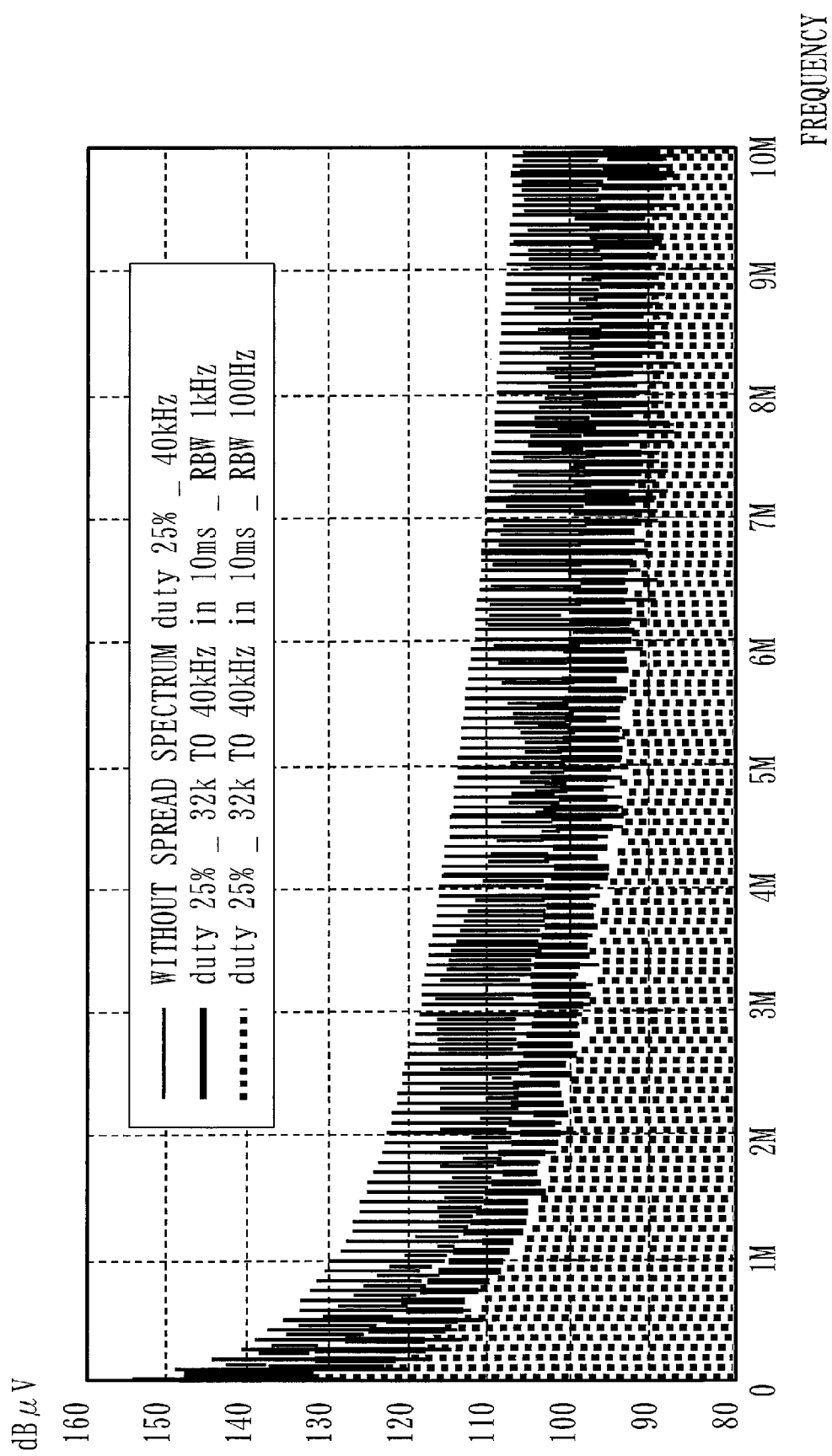
FIG. 7 is a view illustrating an effect of control according to a fifth embodiment.

As a specific example, as illustrated in FIG. 7, the spread circuit 223 changes the duty ratio from 50% to 25% when gradually fluctuating a switching frequency in accordance with a rule of lowest 32 kHz (−20% of basic switching frequency) highest 48 kHz (+20% of basic switching frequency)→lowest 32 kHz (−20% of basic switching frequency) in switching time of 10 ms. In this specific example, in a case of resolution bandwidth (RBW) of 100 Hz, the low frequency magnetic noise or the low frequency conductive noise of the anode power supply 20 was reduced by approximately 25 dBμV at low frequencies and approximately 20 to 25 dBμV at high frequencies as compared with a case without spread spectrum.

REFERENCE SIGNS LIST

10: Hall thruster power supply device, 20: anode power supply, 21: voltage output circuit, 211: input filter, 212: main switch, 213: current transformer, 214: main transformer, 215: diode rectifier, 216: output filter, 217: driver, 22: pulse width control circuit, 221: comparison circuit, 222: pulse generation circuit, 223: spread circuit, 30: magnetic field power supply, 40: Hall thruster, 41: anode, 42: cathode, 43: magnetic circuit, 51: input voltage, 52: output voltage, 53: on/off signal, 54: control signal, 55: detection signal, 56: comparison signal, 57: pulse width control signal, 58: spread signal, 59: magnetic field signal.

The invention claimed is:

1. A Hall thruster power supply device comprising:
   a spread circuit configured to output a spread signal obtained by performing spread spectrum on a pulse width signal based on a control signal; and
   a voltage output circuit configured to output an output voltage to a Hall thruster in accordance with the spread signal output by the spread circuit,
   wherein the pulse width signal is proportional to a comparison signal determined based on a difference between the control signal and the output voltage.

2. A Hall thruster power supply device comprising:
   a spread circuit configured to output a spread signal obtained by performing spread spectrum on a pulse signal based on a control signal; and
   a voltage output circuit configured to output an output voltage to a Hall thruster in accordance with the spread signal output by the spread circuit,
   wherein the spread circuit outputs the spread signal depending on a magnetic field signal which controls a magnetic field of the Hall thruster.

3. The Hall thruster power supply device according to claim 2, wherein the spread circuit outputs the spread signal which increases the output voltage as the magnetic field controlled by the magnetic field signal increases in strength.

4. The Hall thruster power supply device according to claim 1,
   wherein the spread circuit outputs the spread signal modulated in a range between ±10% and ±50% of a basic switching frequency.

5. The Hall thruster power supply device according to claim 2,
   wherein the spread circuit outputs the spread signal modulated in a range between ±10% and ±50% of a basic switching frequency.

6. The Hall thruster power supply device according to claim 3,
   wherein the spread circuit outputs the spread signal modulated in a range between ±10% and ±50% of a basic switching frequency.

7. The Hall thruster power supply device according to claim 1, wherein the spread circuit outputs the spread signal obtained by sequentially switching a plurality of switching frequencies for each reference time among one or more reference times.

8. The Hall thruster power supply device according to claim 2, wherein the spread circuit outputs the spread signal obtained by sequentially switching a plurality of switching frequencies for each reference time among one or more reference times.

9. The Hall thruster power supply device according to claim 3, wherein the spread circuit outputs the spread signal obtained by sequentially switching a plurality of switching frequencies for each reference time among one or more reference times.

10. The Hall thruster power supply device according to claim 4, wherein the spread circuit outputs the spread signal obtained by sequentially switching a plurality of switching frequencies for each reference time among one or more reference times.

11. The Hall thruster power supply device according to claim 5, wherein the spread circuit outputs the spread signal obtained by sequentially switching a plurality of switching frequencies for each reference time among one or more reference times.

12. The Hall thruster power supply device according to claim 6, wherein the spread circuit outputs the spread signal obtained by sequentially switching a plurality of switching frequencies for each reference time among one or more reference times.

13. The Hall thruster power supply device according to claim 1, wherein the spread circuit outputs the spread signal obtained by sequentially switching a plurality of duty ratios for each reference time among one or more reference times.

14. The Hall thruster power supply device according to claim 2, wherein the spread circuit outputs the spread signal obtained by sequentially switching a plurality of duty ratios for each reference time among one or more reference times.

15. The Hall thruster power supply device according to claim 3, wherein the spread circuit outputs the spread signal obtained by sequentially switching a plurality of duty ratios for each reference time among one or more reference times.

16. The Hall thruster power supply device according to claim 4, wherein the spread circuit outputs the spread signal obtained by sequentially switching a plurality of duty ratios for each reference time among one or more reference times.

17. The Hall thruster power supply device according to claim 5, wherein the spread circuit outputs the spread signal obtained by sequentially switching a plurality of duty ratios for each reference time among one or more reference times.

18. The Hall thruster power supply device according to claim 6, wherein the spread circuit outputs the spread signal obtained by sequentially switching a plurality of duty ratios for each reference time among one or more reference times.

19. A control method of a Hall thruster power supply device comprising:
   outputting a spread signal obtained by performing spread spectrum on a pulse width signal in accordance with a control signal; and
   outputting an output voltage to a Hall thruster in accordance with the spread signal,
   wherein the pulse width signal is proportional to a comparison signal determined based on a difference between the control signal and the output voltage.

* * * * *